United States Patent
Shechtman

(10) Patent No.: US 11,557,274 B2
(45) Date of Patent: Jan. 17, 2023

(54) ROBUST CHECKPOINT SELECTION FOR MONOTONIC AUTOREGRESSIVE SEQ2SEQ NEURAL GENERATIVE MODELS

(71) Applicant: International Business Machines Corporation, Armonk, NY (US)

(72) Inventor: Vyacheslav Shechtman, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 121 days.

(21) Appl. No.: 17/200,972

(22) Filed: Mar. 15, 2021

(65) Prior Publication Data

US 2022/0293083 A1 Sep. 15, 2022

(51) Int. Cl.
*G10L 15/16* (2006.01)
*G10L 25/30* (2013.01)
*G10L 13/08* (2013.01)
*G10L 13/02* (2013.01)

(52) U.S. Cl.
CPC .............. *G10L 13/02* (2013.01); *G10L 25/30* (2013.01)

(58) Field of Classification Search
CPC ......... G10L 13/08; G10L 25/30; G10L 15/16; G10L 15/063
See application file for complete search history.

(56) References Cited

U.S. PATENT DOCUMENTS 5,625,749 A * 4/1997 Goldenthal ........... G10L 15/148
704/254
2019/0324856 A1 10/2019 Zhao
2021/0141798 A1* 5/2021 Steedman Henderson ..................
G06N 3/0454

FOREIGN PATENT DOCUMENTS

CN 108711421 A * 10/2018 ........... G10L 15/063
KR 20200092511 A * 8/2020 ............. G10L 13/08

OTHER PUBLICATIONS

Zhang et al.; "Forward Attention in Sequence—To-Sequence Acoustic Modeling for Speech Synthesis;" 2018 IEEE International Conference on Acoustics, Speech and Signal Processing (ICASSP), 2018, pp. 4789-4793 (Year: 2018).*
Liu, Hongbin and Ickjai Lee. "Bridging the Gap Between Training and Inference for Spatio-Temporal Forecasting." ECAI (Sep. 2020).

(Continued)

*Primary Examiner* — Shreyans A Patel
(74) *Attorney, Agent, or Firm* — Gregory J Kirsch

(57) ABSTRACT

Embodiments may provide improved techniques to assess model checkpoint stability on unseen data on-the-fly, so as to prevent unstable checkpoints from being saved, and to avoid or reduce the need for an expensive thorough evaluation. For example, a method may comprise passing a set of input sequences through a checkpoint of a sequence to sequence model in inference mode to obtain a set of generated sequences of feature vectors, determining whether each of a plurality of generated sequences of feature vectors is complete, counting a number of incomplete generated sequences of feature vectors among the plurality of generated sequences of feature vectors, generating a score indicating a stability of the model based on the count of incomplete generated sequences of feature vectors, and storing the model checkpoint when the score indicating the stability of the model is above a predetermined threshold.

18 Claims, 5 Drawing Sheets

(56) References Cited

OTHER PUBLICATIONS

Y. Keneshloo, T. Shi, N. Ramakrishnan and C. K. Reddy, "Deep Reinforcement Learning for Sequence-to-Sequence Models," in IEEE Transactions on Neural Networks and Learning Systems, vol. 31, No. 7, pp. 2469-2489, Jul. 2020, doi: 10.1109/TNNLS.2019.2929141.
Touvron, Hugo et al. "Fixing the train-test resolution discrepancy." NeurIPS (Apr. 2019).
Ajay Jangid, "Intuitive Understanding of Seq2seq model & Attention Mechanism in Deep Learning," in Medium, Sep. 2019.
Tianxing, He & Zhang, Jingzhao & Zhou, Zhiming & Glass, James, "Quantifying Exposure Bias for Neural Language Generation," arXiv: https://arxiv.org/pdf/1905.10617.pdf (Apr. 2019).
Xu, Yifan & Zhang, Kening & Dong, Haoyu & Sun, Yuezhou & Zhao, Wenlong & Tu, Zhuowen, "Rethinking Exposure Bias In Language Modeling," arXiv: https://arxiv.org/pdf/1910.11235.pdf, (Mar. 2020).

\* cited by examiner

ROBUST CHECKPOINT SELECTION FOR MONOTONIC AUTOREGRESSIVE SEQ2SEQ NEURAL GENERATIVE MODELS

BACKGROUND

The present invention relates to techniques to assess model checkpoint stability on unseen data on-the-fly, so as to prevent unstable checkpoints from being saved Many popular sequence-to-sequence (seq2seq) neural models are autoregressive. That is, they generate each token by conditioning it on previously generated tokens. As such, they are vulnerable to "exposure bias," which refers to the train-test discrepancy that seemingly arises when an autoregressive generative model uses only ground-truth contexts at training time but generated ones at test (i.e. inference) time (so called "teacher-forcing" mode).

Frequently, in such models a converged validation loss in teacher-forcing mode is not indicative of model quality at inference time. More specifically, consider seq2seq generative models with attention mechanism. They are frequently used in a wide range of tasks, such as machine translation, text summarization, image/video caption generation, textual entailment, and speech synthesis.

In the core of attention mechanisms, there is a mapping function that converts real values to probabilities. At each output time step $t \in \mathbb{Z}$ in a range [0,T-1], corresponding to the output sequence index t, the vector of attention probabilities (also known as attention weights) is produced, determining the relative attention of the output at instant t to the input sequence at input time steps $\{n\}_{n=0}^{N-1}$. This process is repeated until the end-of-sequence symbol is generated. The N×T matrix of the attention probabilities (also known as the alignment matrix, having the attention weight vectors as its columns) represents the input-output sequence alignment, which is important in many applications. For example, in speech synthesis, the input-output alignment directly determines the speaking pace and strongly influences the speaking style of the synthesized audio.

Once the validation loss is converged, many model checkpoints can be saved to be used for inference. Some of them generalize better than others, and some can even become unstable (although their validation loss is as low as others'). That is, they may fail to complete sequence generation for certain input sequences (early stop). Given a certain model training procedure that produces a large set of model checkpoints, it is desirable to store only "stable" models, such as models that generalize well on unseen data in inference mode. A reduced subset of stored stable checkpoints may undergo a thorough evaluation process, that might involve not just objective, but subjective evaluations of the generated sequences. (In use cases, where no ground truth is present, there is no ultimate objective measures for output sequence quality evaluation, for example, a speech synthesis use case). Such evaluations may be costly and time/compute consuming, making it desirable to avoid or reduce the need for such evaluations.

Accordingly, a need arises for improved techniques to assess checkpoint stability on unseen data on-the-fly, so to prevent unstable checkpoints from being saved, and to avoid or reduce the need for an expensive thorough evaluation.

SUMMARY

Embodiments may provide improved techniques to assess model checkpoint stability on unseen data on-the-fly, so as to prevent unstable checkpoints from being saved, and to avoid or reduce the need for an expensive thorough evaluation. For example, embodiments may utilize use cases with monotonic attention structure, where the attention vectors' peaks comprise a monotonous trajectory.

For example, in an embodiment, method may be implemented in a computer system comprising a processor, memory accessible by the processor, and computer program instructions stored in the memory and executable by the processor and the method may comprise passing a set of input sequences through a model checkpoint of a sequence to sequence model in inference mode to obtain a set of generated sequences of feature vectors, determining whether each of a plurality of generated sequences of feature vectors is complete, counting a number of incomplete generated sequences of feature vectors among the plurality of generated sequences of feature vectors, generating a score indicating a stability of the model based on the count of incomplete generated sequences of feature vectors, and storing the model checkpoint when the score indicating the stability of the model is above a predetermined threshold.

In embodiments, passing the set of input sequences may comprise obtaining a set of alignment matrices for a set of input sequences, as the input sequences pass through a the model checkpoint. Determining whether each of a plurality of generated sequences of feature vectors is complete may be performed using a sequence completion operator that utilizes monotonous structures of the set of alignment matrices. The score indicating the stability of the model may be further based on at least one of an average entropy, a maximum entropy, an average attention weight vector peak value, a maximum attention weight vector peak value, and counts of monotonicity break-up events. Each of the plurality of generated sequences of feature vectors may comprise spectral features to be used to generate synthesized speech. The count of incomplete sequences may comprise earlystopping events and failure-to-stop events.

In an embodiment, a system may comprise a processor, memory accessible by the processor, and computer program instructions stored in the memory and executable by the processor to perform passing a set of input sequences through the model a checkpoint of a sequence to sequence model in inference mode to obtain a set of generated sequences of feature vectors, determining whether each of a plurality of generated sequences of feature vectors is complete, counting a number of incomplete generated sequences of feature vectors among the plurality of generated sequences of feature vectors, generating a score indicating a stability of the model based on the count of incomplete generated sequences of feature vectors; and storing the model checkpoint when the score indicating the stability of the model is above a predetermined threshold.

In an embodiment, a computer program product may comprise a non-transitory computer readable storage having program instructions embodied therewith, the program instructions executable by a computer, to cause the computer to perform a method that may comprise passing a set of input sequences through a model checkpoint of a sequence to sequence model in inference mode to obtain a set of generated sequences of feature vectors, determining whether each of a plurality of generated sequences of feature vectors is complete, counting a number of incomplete generated sequences of feature vectors among the plurality of generated sequences of feature vectors, generating a score indicating a stability of the model based on the count of incomplete generated sequences of feature vectors; and storing the model checkpoint when the score indicating the stability of the model is above a predetermined threshold.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION

Figure 1:
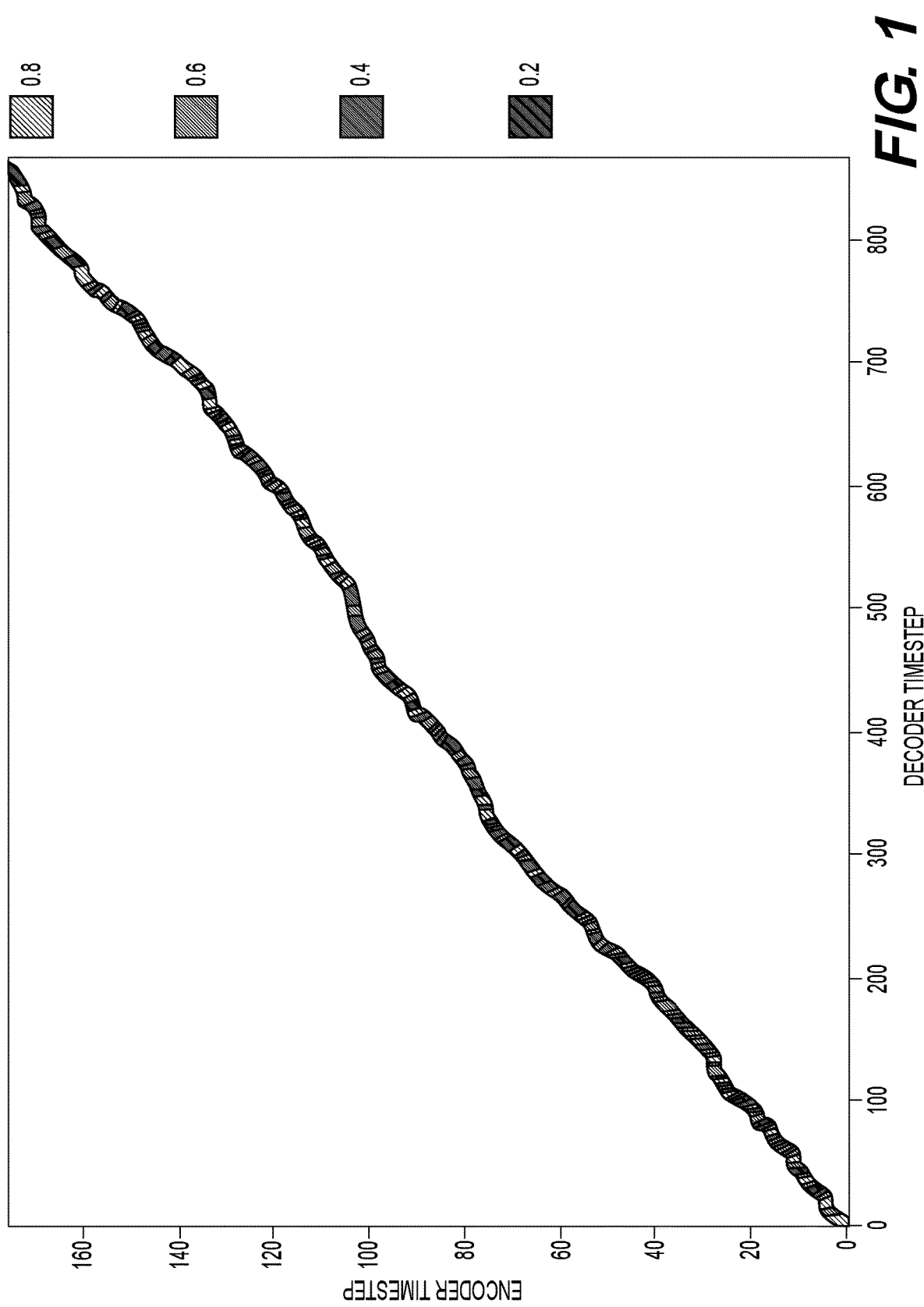
FIG. 1 illustrates an exemplary alignment matrix for a converged model according to embodiments of the present techniques.

Embodiments may provide improved techniques to assess checkpoint stability on unseen data on-the-fly, so to prevent unstable checkpoints from being saved, and to avoid or reduce the need for an expensive thorough evaluation. For example, embodiments may utilize use cases with monotonic attention structure, where the attention vectors' peaks comprise a monotonous trajectory, for example, as shown in FIG. 1.

Figure 2:
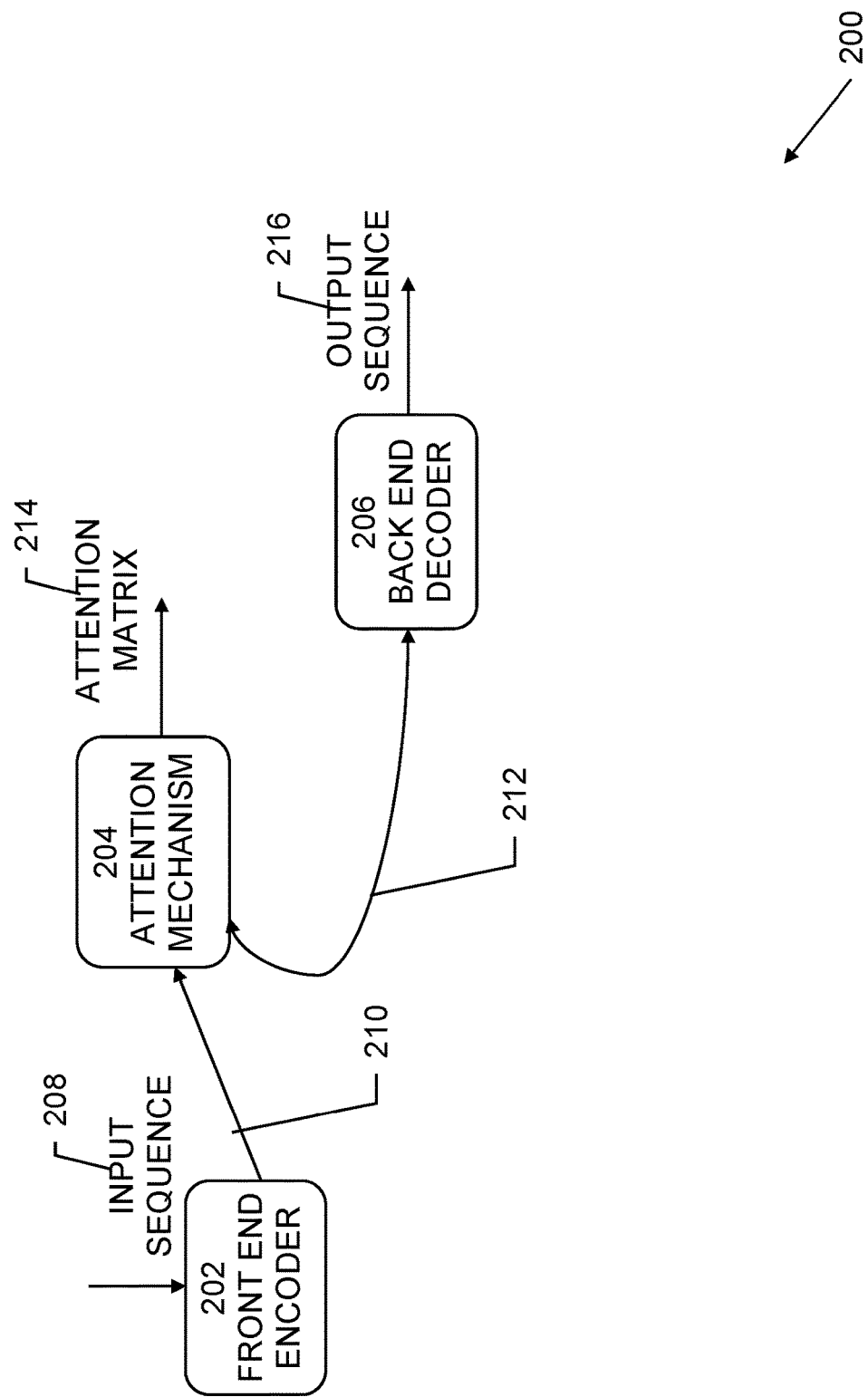
FIG. 2 is an exemplary block diagram of an embodiment of a system architecture in which the present techniques may be implemented.

An exemplary block diagram of an embodiment of a system architecture 200 in which the present techniques may be implemented is shown in FIG. 2. System architecture 200 may include front end encoder 202, attention mechanism 204, and back end decoder 206. Front end encoder 202 may receive an input sequence 208 of data, such as embeddings, and may encode 210 input sequence 208. Front end encoder 202 may include, for example, convolutional and bidirectional Long Short-Term Memory (Bi-LSTM) layers to perform the encoding. Encoded data 210 may be input to attention mechanism 204. Attention mechanism 204 generates a weighted combination of encoder outputs in order to enhance the important parts of the input data. Attention mechanism 204 may generate alignment matrix 214 comprising attention weight indicating the strength of attention of the generated sequence to the input sequence. Weighted combination of encoder outputs 212 may be input to back end decoder 206, which may decode the input to generate an output sequence 216.

Embodiments may provide features such as Front-End Encoder, Back End Decoder with auto-regressive feedback, a choice of targets, and training losses.

Figure 3:
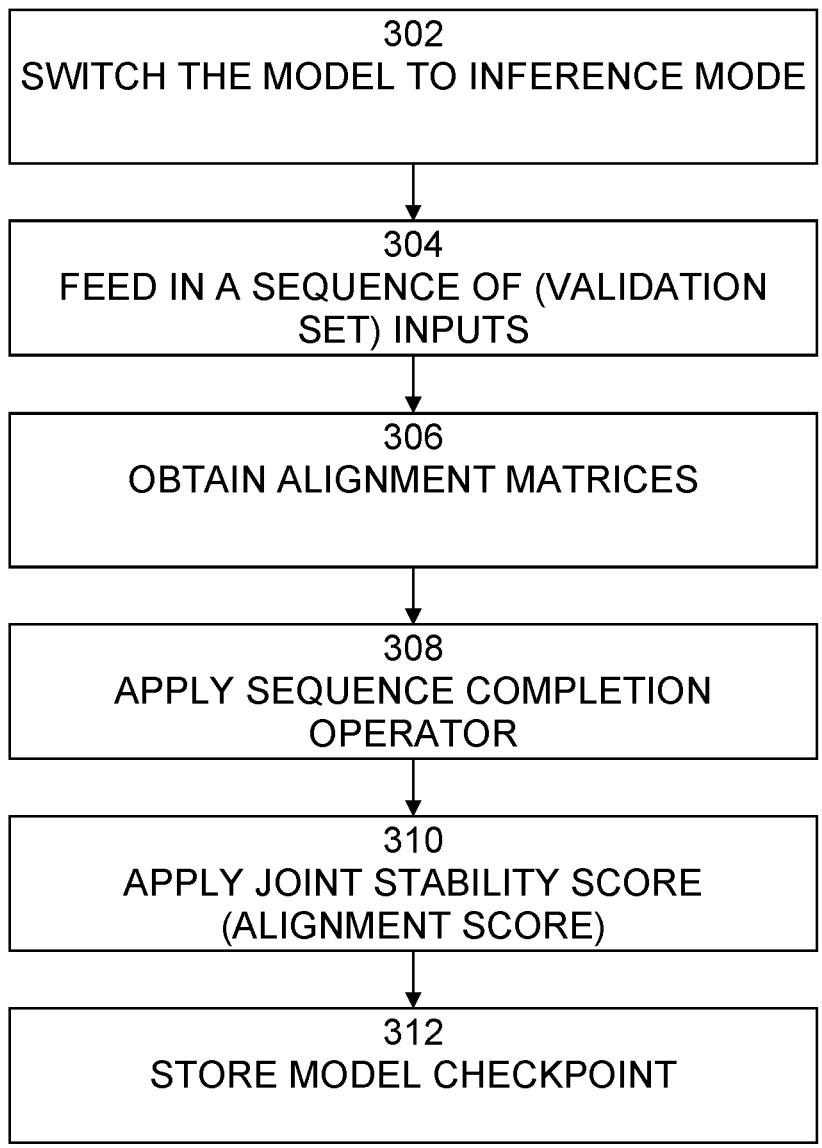
FIG. 3 an exemplary flow diagram of a process of obtaining model checkpoints according to embodiments of the present techniques.

An exemplary process 300 of obtaining model checkpoints is shown in FIG. 3. Process 300 begins with 302, in which the model may be switched to inference mode from training mode. At 304, a sequence of inputs making up a validation set may be input to the model in order to tune and validate the training of the model. At 306, a set of M alignment matrices A may be obtained for a set of M input sequences, as they pass through a given model-checkpoint (run in inference mode). This may be done to assess model stability on an arbitrary validation set, in inference mode, with no output targets, based on automatic analysis of alignment matrix, such as a sequence of attention weight vectors. At 308, a sequence completion operator, f(A)→Boolean, may be applied. The sequence completion operator may exploit the monotonous structure of alignment matrix A to determine whether a sequence generation generated a whole sequence. For example, in speech synthesis, this may be used to determine whether or not a synthesized sentence is complete. A count of incomplete sequences may be determined.

At 310, a joint stability score (alignment score) may be applied for this set of input sequences. The joint stability score may utilize the count of incomplete sequences. Optionally, the score may utilize other alignment matrix metrics, such as an average/maximum entropy, an average/maximum attention weight vector peak value, counts of monotonicity break-up events, etc. The joint stability score may be computed using a formula, for example:

$$\text{Score}(\{A\}_{i=1}^{N}) = \alpha \sum_{i=1}^{N} f(A_i) +$$

$$(2 - Average_i(AvgColumnPeak(A_i)) - \text{Min}_i(MinColumnPeak(A_i))),$$

where α=10 is used. At 312, the model checkpoint may be stored if and only if the joint stability score is higher than a predetermined threshold.

Exemplary embodiments of the present techniques are described for speech synthesis examples, it is to be noted that the present techniques may be applied to any monotonic S2S neural generative models. Due to the inherent exposure bias of attentive autoregressive S2S models, a minimal loss checkpoint, estimated in teacher-forcing mode, does not necessarily correspond to a model offering the most robust performance at inference time. This argues for evaluating model checkpoint performance on a validation set in inference mode.

For the example of speech synthesis, if acoustic targets are available for the validation set, a mean-squared error in conjunction with dynamic time warping may roughly assess phonetic alignment convergence. This, however, is a rather noisy measurement, as the synthesized utterances can differ considerably from the target reference and still sound natural. For a more informative evaluation, a separate Automatic Speech Recognition (ASR) model may be used to transcribe or force-align the synthesized speech to assess Word Error Rate (WER), Character Error Rate (CER) or some other forced alignment quality metrics. However, deploying a separate ASR engine for model checkpoint selection during training is computationally heavy and not always feasible.

Embodiments may evaluate both alignment convergence and robustness metrics that can be derived in a straightforward manner from the alignment matrix that is readily available as a by-product of any attentive S2S model. In a properly converged monotonic S2S model (e.g. speech generation from input phonetic sequence), the alignment matrix is expected to be almost strictly monotonous, as shown, for example, in FIG. 1, with very few or no skips (which might otherwise result from imprecise phonetic transcription and/or presence of "empty" syntactic or boundary symbols). In many Additive Energy-based Attention mechanisms, the alignment matrix has a wide spread of values during the initial steps of learning, and gradually moves toward a unimodal probabilistic distribution across the attention weights at each decoding step. In such systems, the attention weight entropy, averaged over the utterances of a validation set, can serve as a fair indicator of the attention convergence when the system is evaluated in inference mode.

Given a training tuple consisting of a K-point input phonetic sequence and respective N-point output acoustic sequence, the average utterance entropy is defined by:

$$E_{avg}^{utt} = \frac{1}{N}\sum_{n=1}^{N}\sum_{k=1}^{K} -a_{k,n}\log a_{k,n},$$

where $\alpha_{k,n}$ is the (k, n) entry of the K×N alignment matrix assigning an attention weight linking the nth observation with the kth input symbol. However, the stability of consecutive checkpoints (stored several times per epoch) can vary from checkpoint to checkpoint, even after both the training loss and the entropy converge. This suggests the need for an additional stability evaluation mechanism. To that end, embodiments may utilize a simple attention-based metric that is more indicative of a model's robustness based on incomplete utterance counts within a validation set.

Let $s = \{s_k\}_{k=1}^{K}$ be a sequence of K inputs, and $A = \{\alpha_n\}_{n=1}^{N}$ be an alignment matrix, i.e., a sequence of output attention column vectors over the N outputs $\alpha_n = \{\alpha_{k,n}\}_{k=1}^{K}$, then the output attention sequence $o = \{o_n\}_{n=1}^{N}$ is defined with entries:

$$o_n = s_k |_{k=\tilde{k}_n}, \text{ where } \tilde{k}_n = \operatorname*{argmax}_{k} a_{k,n},$$

and the attention strength vector $w = \{w_n\}_{n=1}^{N}$ similarly by $$w_n = \max_{k} a_{k,n} = a_{\tilde{k},n}.$$

Let $s^{phn} = \{s_k^{phn}\}_{k=1}^{K^*}$ be a true input phone sequence, defined as a phone sequence with its non-phonetic inputs discarded (such as silences, boundary, and punctuation labels, etc., where attention can be weak). We define a strongly attended, true-phone output sequence as $$\{o^*_n\}_{n=1}^{N^*} = \{o_n | o_n \in s^{phn} \text{ AND } w_n > w_{th}\}_{n=1}^{N},$$

(where we have used the empirically chosen threshold $w_{th} = 0.34$), and define an utterance-completion-failure operator to be TRUE, if the last strongly-attended true phone is not equal to the last true phone in the input sequence:

$$f(s, A) = \begin{cases} 0, & \text{if } o_n^*|_{n=N^*} = s_k^{phn}|_{k=K^*} \\ 1, & \text{otherwise.} \end{cases}$$

Embodiments of the operator may catch not just early-stopping events, but also failure-to-stop events, in which the last "true phone" loses its attention. Given the utterance completion failure operator and a validation corpus consisting of L sentences, a checkpoint robustness loss R may be defined as:

$$R(\{A^{(l)}, s^{(l)}\}_{l=1}^{L}) = \alpha\sum_{l=1}^{L} f(s^{(l)}, A^{(l)}) + \left(2 - \frac{1}{L}\sum_{l=1}^{L}\left(\operatorname*{mean}_{n} w_n^{(l)} + \operatorname*{min}_{n} w_n^{(l)}\right)\right)$$

where α=10 is used so that the major contribution comes from the utterance-completion-failure count.

Figure 4:
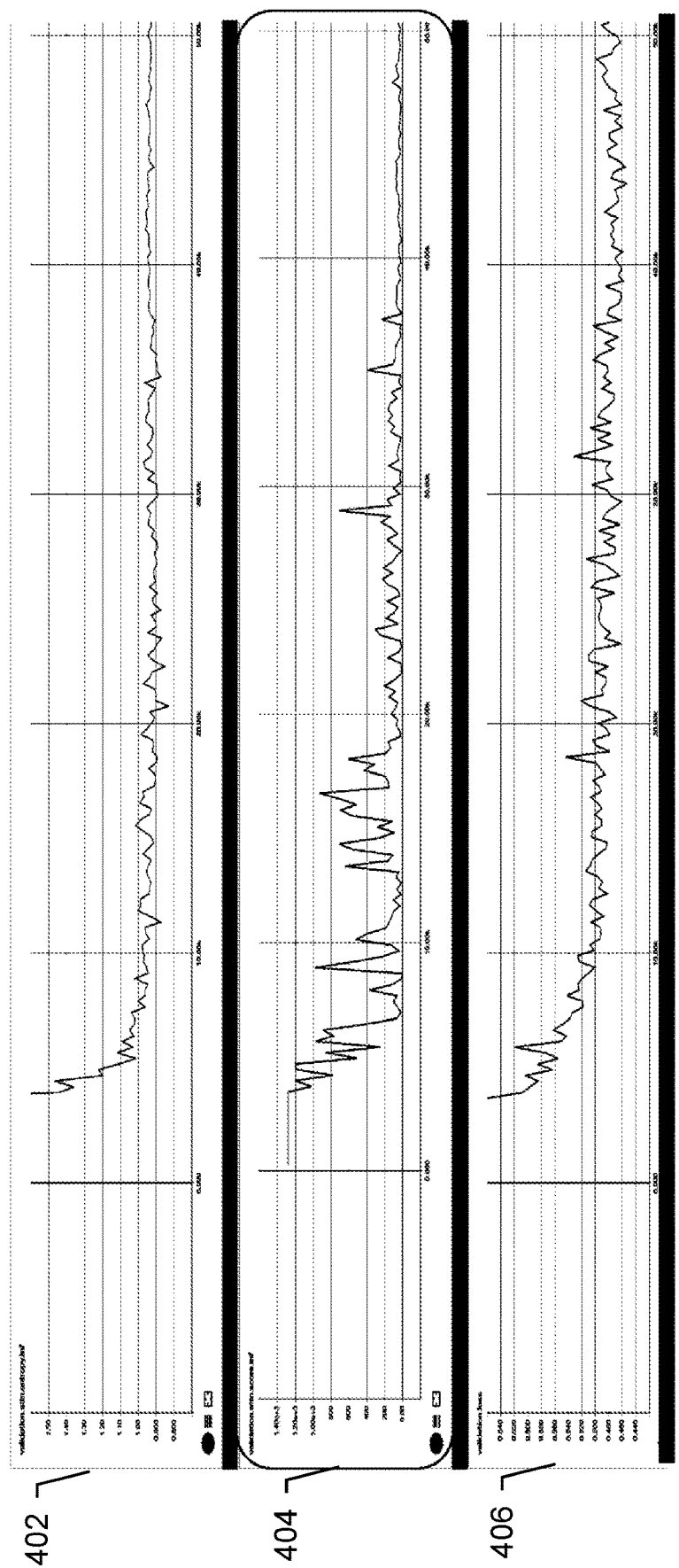
FIG. 4 illustrates examples of validation metrics according to embodiments of the present techniques.

Examples of validation metrics are shown in FIG. 4. In this example, the output of the real seq2seq speech synthesis training, with a validation set of N=128, is shown. At 402, the average entropy if the alignment in inference mode is shown. At 404, the joint stability score (in inference mode), incorporating the incomplete sequence count, is shown. At 406, the validation loss in teacher-forcing loss is shown. It may be observed that after the validation loss converges, and the entropy score stabilizes, only the joint stability score provides a meaningful indication of model stability.

Figure 5:
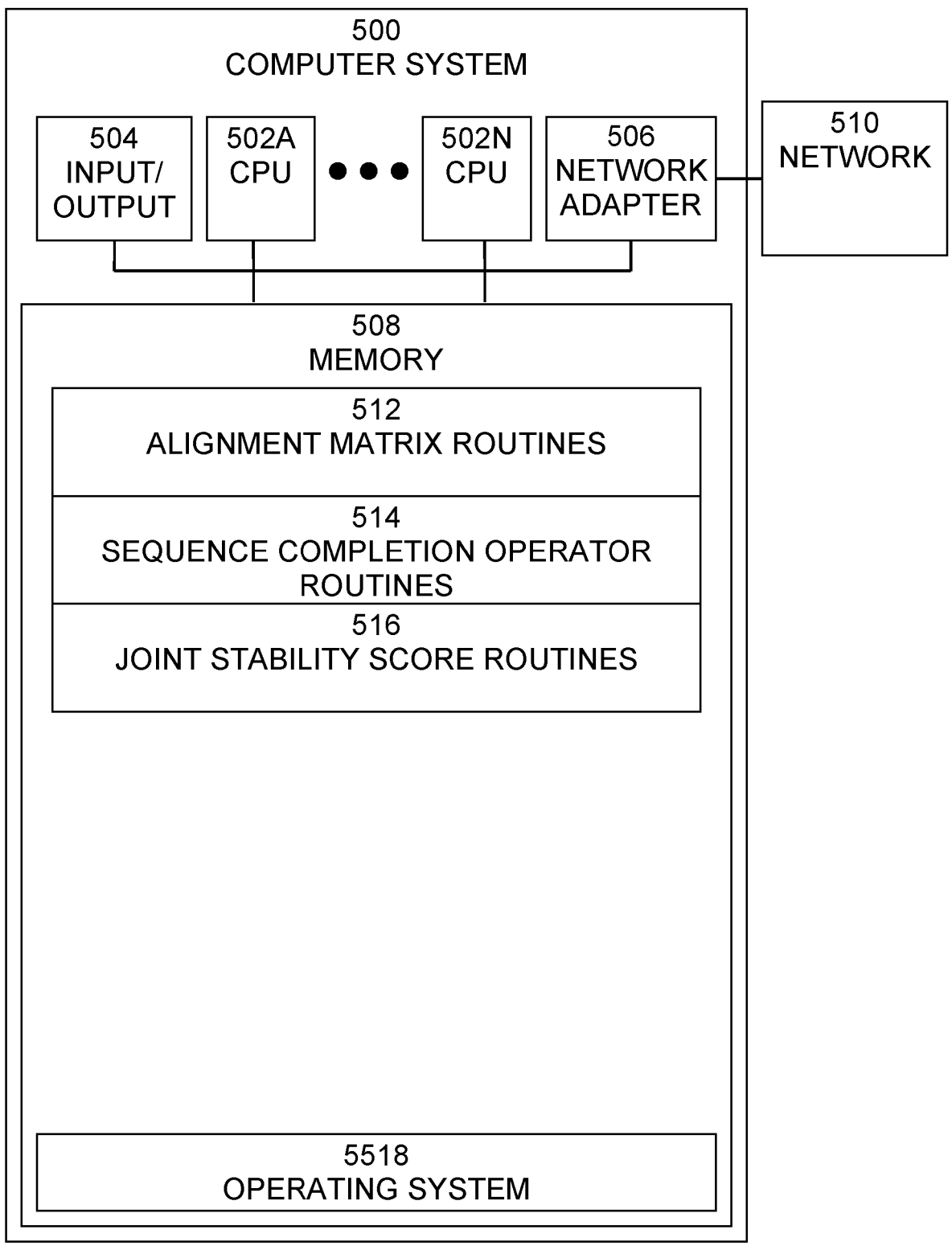
FIG. 5 is an exemplary block diagram of a computer system, in which processes involved in the embodiments described herein may be implemented.

An exemplary block diagram of a computer system 500, in which processes and components involved in the embodiments described herein may be implemented, is shown in FIG. 5. Computer system 500 may be implemented using one or more programmed general-purpose computer systems, such as embedded processors, systems on a chip, personal computers, workstations, server systems, and mini-computers or mainframe computers, or in distributed, networked computing environments. Computer system 500 may include one or more processors (CPUs) 502A-502N, input/output circuitry 504, network adapter 506, and memory 508. CPUs 502A-502N execute program instructions in order to carry out the functions of the present communications systems and methods. Typically, CPUs 502A-502N are one or more microprocessors, such as an INTEL CORE® processor. FIG. 5 illustrates an embodiment in which computer system 500 is implemented as a single multi-processor computer system, in which multiple processors 502A-502N share system resources, such as memory 508, input/output circuitry 504, and network adapter 506. However, the present communications systems and methods also include embodiments in which computer system 500 is implemented as a plurality of networked computer systems, which may be single-processor computer systems, multi-processor computer systems, or a mix thereof.

Input/output circuitry 504 provides the capability to input data to, or output data from, computer system 500. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 506 interfaces device 500 with a network 510. Network 510 may be any public or proprietary LAN or WAN, including, but not limited to the Internet.

Memory 508 stores program instructions that are executed by, and data that are used and processed by, CPU 502 to perform the functions of computer system 500. Memory 508 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 508 may vary depending upon the function that computer system 500 is programmed to perform. In the example shown in FIG. 5, exemplary memory contents are shown representing routines and data for embodiments of the processes described above. However, one of skill in the art would recognize that these routines, along with the memory contents related to those routines, may not be included on one system or device, but rather may be distributed among a plurality of systems or devices, based on well-known engineering considerations. The present systems and methods may include any and all such arrangements.

In the example shown in FIG. 5, memory 508 may include alignment matrix routines 512, sequence completion operator routines 514, and joint stability score routines 516. Adversarial Auto Alignment matrix routines 512 may include software to obtain a set of alignment matrices, as described above. Sequence completion operator routines 514 may include software to a apply sequence completion operator, as described above. Joint stability score routines 516 may include software to compute and apply a joint stability score, as described above. Operating system 518 may provide overall system functionality.

As shown in FIG. 5, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multi-tasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method, implemented in a computer system comprising a processor, memory accessible by the processor, and computer program instructions stored in the memory and executable by the processor, the method comprising:
   passing a set of input sequences through a checkpoint of a sequence to sequence model in inference mode to obtain a set of generated sequences of feature vectors;
   determining whether each of a plurality of generated sequences of feature vectors is complete;
   counting a number of incomplete generated sequences of feature vectors among the plurality of generated sequences of feature vectors;
   generating a score indicating a stability of the model based on the count of incomplete generated sequences of feature vectors; and
   storing the model checkpoint when the score indicating the stability of the model is above a predetermined threshold.

2. The method of claim 1, wherein passing the set of input sequences comprises obtaining a set of alignment matrices for a set of input sequences, as the input sequences pass through the model checkpoint.

3. The method of claim 2, wherein determining whether each of a plurality of generated sequences of feature vectors is complete is performed using a sequence completion operator that utilizes monotonous structures of the set of alignment matrices.

4. The method of claim 3, wherein the score indicating the stability of the model is further based on at least one of an average entropy of alignment matrices, a maximum entropy of alignment matrices, an average attention weight vector peak value, a maximum attention weight vector peak value, and counts of monotonicity break-up events.

5. The method of claim 1, wherein each of the plurality of generated sequences of feature vectors comprises spectral features to be used to generate synthesized speech.

6. The method of claim 5, wherein the count of incomplete sequences of feature vectors comprises early-stopping events and failure-to-stop events.

7. A system comprising a processor, memory accessible by the processor, and computer program instructions stored in the memory and executable by the processor to perform:
   passing a set of input sequences through a checkpoint of a sequence to sequence model in inference mode to obtain a set of generated sequences of feature vectors;
   determining whether each of a plurality of generated sequences of feature vectors is complete;
   counting a number of incomplete generated sequences of feature vectors among the plurality of generated sequences of feature vectors;
   generating a score indicating a stability of the model based on the count of incomplete generated sequences of feature vectors; and
   storing the model checkpoint when the score indicating the stability of the model is above a predetermined threshold.

8. The system of claim 7, wherein passing the set of input sequences comprises obtaining a set of alignment matrices for a set of input sequences, as the input sequences pass through a the model checkpoint.

9. The system of claim 8, wherein determining whether each of a plurality of generated sequences of feature vectors is complete is performed using a sequence completion operator that utilizes monotonous structures of the set of alignment matrices.

10. The system of claim 9, wherein the score indicating the stability of the model is further based on at least one of an average entropy, a maximum entropy, an average attention weight vector peak value, a maximum attention weight vector peak value, and counts of monotonicity break-up events.

11. The system of claim 7, wherein each of the plurality of generated sequences of feature vectors comprises spectral features to be used to generate synthesized speech.

12. The system of claim 11, wherein the count of incomplete sequences comprises early-stopping events and failure-to-stop events.

13. A computer program product comprising a non-transitory computer readable storage having program instructions embodied therewith, the program instructions executable by a computer, to cause the computer to perform a method comprising:

passing a set of input sequences through a checkpoint of a sequence to sequence model in inference mode to obtain a set of generated sequences of feature vectors;

determining whether each of a plurality of generated sequences of feature vectors is complete;

counting a number of incomplete generated sequences of feature vectors among the plurality of generated sequences of feature vectors;

generating a score indicating a stability of the model based on the count of incomplete generated sequences; of feature vectors and storing the model checkpoint when the score indicating the stability of the model is above a predetermined threshold.

14. The computer program product of claim 13, wherein passing the set of input sequences comprises obtaining a set of alignment matrices for a set of input sequences, as the input sequences pass through a the model checkpoint.

15. The computer program product of claim 14, wherein determining whether each of a plurality of generated sequences of feature vectors is complete is performed using a sequence completion operator that utilizes monotonous structures of the set of alignment matrices.

16. The computer program product of claim 15, wherein the score indicating the stability of the model is further based on at least one of an average entropy, a maximum entropy, an average attention weight vector peak value, a maximum attention weight vector peak value, and counts of monotonicity break-up events.

17. The computer program product of claim 13, wherein each of the plurality of generated sequences of feature vectors comprises spectral features to be used to generate synthesized speech.

18. The system of claim 17, wherein the count of incomplete sequences comprises early-stopping events and failure-to-stop events.

* * * * *